United States Patent [19]
Cheng

[11] Patent Number: 6,038,298
[45] Date of Patent: Mar. 14, 2000

[54] LOWER CASING STRUCTURE OF PAYPHONE

[75] Inventor: Max Cheng, Taipei, Taiwan

[73] Assignee: Karlin Telecom Corp., Taipei, Taiwan

[21] Appl. No.: 09/166,574

[22] Filed: Oct. 6, 1998

[51] Int. Cl.$^7$ .................................................. H04M 17/00
[52] U.S. Cl. .......................... 379/143; 379/145; 379/146; 379/150; 379/155; 194/202
[58] Field of Search ..................................... 379/145, 146, 379/150, 151, 152, 153, 154, 155; 194/202, 290, 350; 232/44

[56] References Cited

U.S. PATENT DOCUMENTS

| | | | |
|---|---|---|---|
| 5,155,765 | 10/1992 | McGough | 379/437 |
| 5,381,469 | 1/1995 | Zausner | 379/143 |
| 5,509,057 | 4/1996 | Anello et al. | 379/145 |
| 5,802,172 | 9/1998 | Ingalsbe et al. | 379/445 |
| 5,818,917 | 10/1998 | Anello et al. | 379/145 |

*Primary Examiner*—Paul Loomis
*Assistant Examiner*—Quoc Tran
*Attorney, Agent, or Firm*—Browdy and Neimark

[57] ABSTRACT

A lower casing structure of a payphone is disclosed, including an outer casing member fit over the lower portion of the payphone and having threaded rods fixed thereon, a reinforcement plate having holes corresponding to and fit over the threaded rods, a coin container shield having a plate portion which has holes corresponding to and fit over the threaded rods and a flange having securing slots formed thereon and a support plate having holes corresponding to and fit over the threaded rods so as to sandwich the coin container shield and the reinforcement plate between the support plate and the outer casing member. Nuts engage the threaded rods for securing the support plate, as well as the coin container shield and the reinforcement plate, to the outer casing member. The support plate has a locking mechanism arranged thereon, comprising a rotatable member operable by a key to be rotatable between a locked position and an unlocked position. The rotatable member has a plurality of camming slots formed thereon, each having a follower pin movably received therein to form a camming engagement therebetween. Each of the follower pins has a latch fixed thereto to be moveable with the follower pin so that when the rotatable member is rotated from the unlocked position to the locked position, the latches are driven to extend through the securing holes in order to engage with locking holes provided inside the payphone for securing the lower casing structure to the lower portion of the payphone.

2 Claims, 4 Drawing Sheets

LOWER CASING STRUCTURE OF PAYPHONE

FIELD OF THE INVENTION

The present invention relates generally to a lower casing of a payphone which receives coin(s) in operation and in particular to a reinforced, burglarproof lower casing which provides a better protection of the coin collection container against damage for burglar purpose.

BACKGROUND OF THE INVENTION

Payphones are operable by receiving coins deposited therein. A coin collection container is provided inside the payphones for collection of the coins deposited therein. The payphones are frequently damaged and the coin collected therein stolen. To protect the payphones from such a burglar damage, a reinforcement plate may be added inside the casing of the payphone, such as that disclosed in U.S. Pat. No. 5,381,469. Such a reinforcement plate is fixed to the lower casing of the payphone by means of for example welding and thus increases the overall thickness of the lower casing which strengthens the casing against damage caused by violent strike.

Although such a reinforced structure is effective in preventing the coin collection container from being stolen, it still may be damaged caused by forcible strike to such an extent that the casing has to be replaced. Since such a reinforced structure is formed by means of welding, the lower casing has to be replaced as a whole, if any parts thereof is damaged. This increases the cost of maintenance of the payphone.

Thus, it is desirable to provide a reinforced, burglarproof payphone lower casing structure which allows the maintenance cost to be reduced.

SUMMARY OF THE INVENTION

Therefor, a primary object of the present invention is to provide a lower casing structure adapted to be releasably mounted to the lower portion of a payphone, the lower casing structure being formed by means of a plurality of mechanical reinforcement members that are separate from each other and releasably secured together so that the parts are individually replaceable and the mechanical strength may still be enhanced.

In accordance with the present invention, there is provided a lower casing structure adapted to be releasably mounted to the lower portion of a payphone, comprising an outer casing member fit over the lower portion of the payphone and having threaded rods fixed thereon, a reinforcement plate having holes corresponding to and fit over the threaded rods, a coin container shield having a plate portion which has holes corresponding to and fit over the threaded rods and a flange having securing slots formed thereon and a support plate having holes corresponding to and fit over the threaded rods so as to sandwich the coin container shield and the reinforcement plate between the support plate and the outer casing member. Nuts engage the threaded rods for securing the support plate, as well as the coin container shield and the reinforcement plate, to the outer casing member. The support plate has a locking mechanism arranged thereon, comprising a rotatable member operable by a key to be rotatable between a locked position and an unlocked position. The rotatable member has a plurality of camming slots formed thereon, each having a follower pin movably received therein to form a camming engagement therebetween. Each of the follower pins has a latch fixed thereto to be moveable with the follower pin so that when the rotatable member is rotated from the unlocked position to the locked position, the latches are driven to extend through the securing holes in order to engage with locking holes provided inside the payphone for securing the lower casing structure to the lower portion of the payphone.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
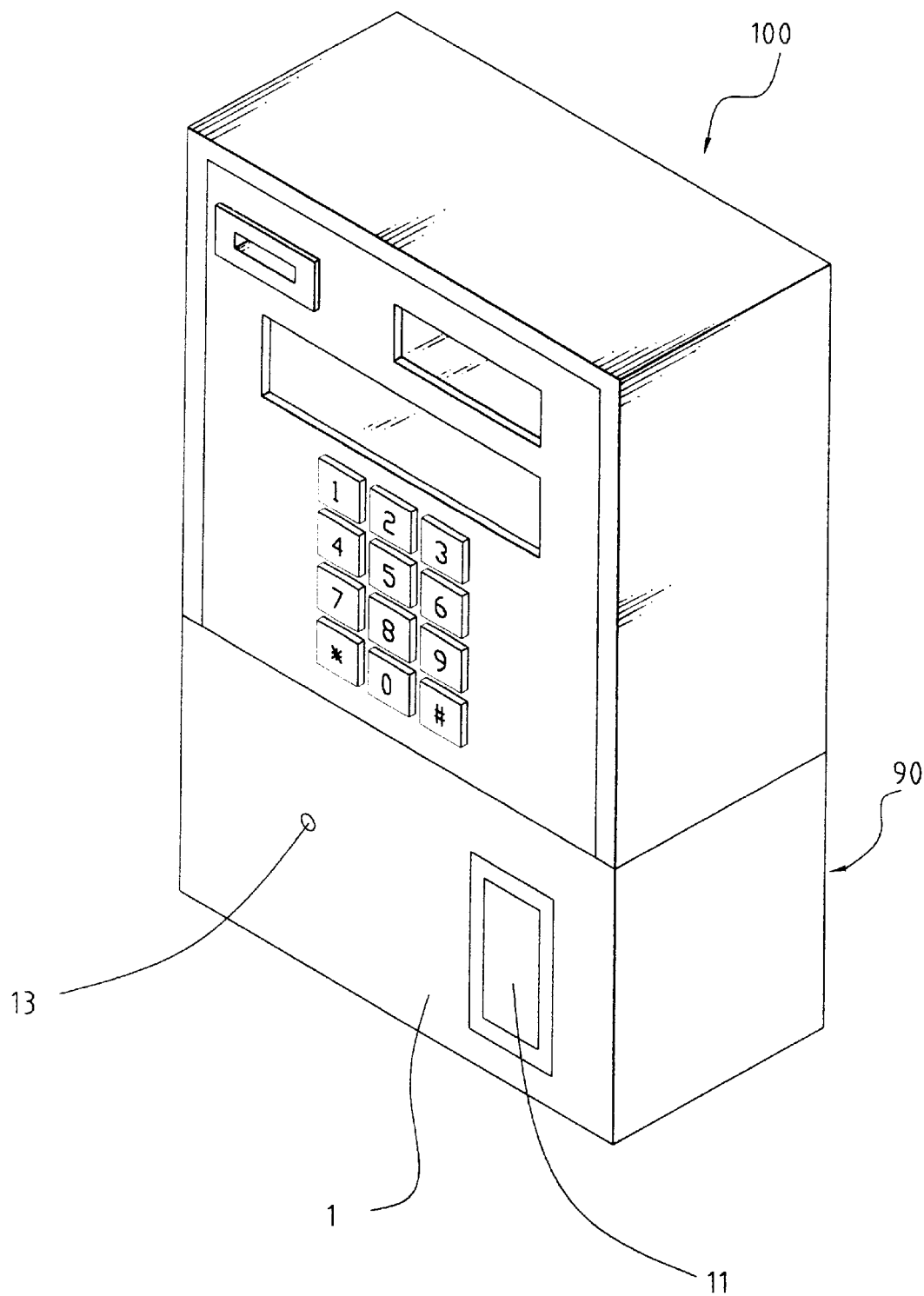
FIG. 1 is perspective view showing a payphone in which a lower casing structure in accordance with the present invention is incorporated.
Figure 2:
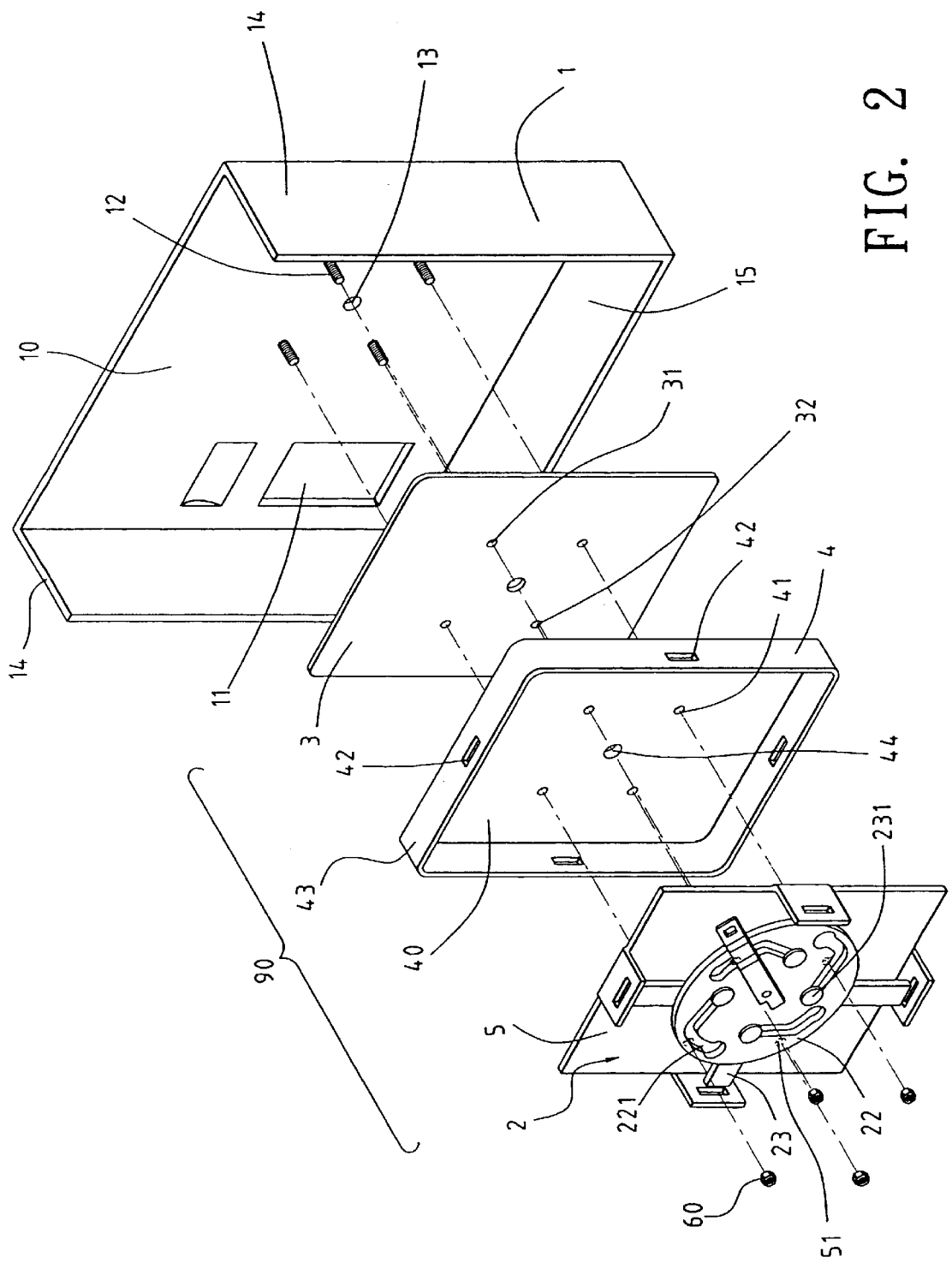
FIG. 2 is an exploded perspective view of the lower casing structure of the present invention.

With reference to the drawings and in particular to FIG. 1, wherein a payphone generally designated at 100 is shown, to which a lower casing 90 constructed in accordance with the present invention is incorporated in such a way to be releasably fixed to the lower portion of the payphone to protect a coin collection container (not shown) disposed in the lower portion of the payphone, and further referring to FIG. 2 wherein an exploded perspective view of the lower casing 90 is shown, the lower casing 90 of the present invention comprises an outer casing member 1 which is sized and shaped to be fit over the lower portion of the payphone 100 and having a front wall 10 having two opposite side walls 14 extending therefrom and a bottom wall 15 extending from lower edge of the front wall 10 and integrally connecting between lower edges of the side walls 14 so as to provide protection to the lower portion of the payphone 100. The outer casing member 1 has a key hole 13 formed on the front wall 10 thereof for the reception of a key (not shown) for selectively releasing the lower casing 90 from the payphone 100. This will be further described.

The front wall 10 of the outer casing member 1 also comprises a plurality of threaded rods 12 fixed to an inner surface thereof.

A coin returning opening 11 is also formed on the front wall 10 of the outer casing member 1, which allows the user of the payphone 100 to obtain returned coins.

A reinforcement plate 3 has a plurality of holes 31 sized and positioned to correspond to the threaded rods 12 of the outer casing member 1 so as to allow the reinforcement plate 31 to be supported on the inner surface of the front wall 10 of the outer casing member 1 by having the holes 31 fit over the threaded rods 12.

A coin container shield 4 has a plate portion 40 having a plurality of holes 41 thereon to be fit over the threaded rods 12 of the outer casing member 1 so as to sandwich the reinforcement plate 31 between the coin container shield 4 and the front wall 10 of the outer casing member 1. The coin container shield 4 has a circumferential flange 43 surrounding the plate portion 40 of the coin container shield 4 and having a plurality of securing slots 42 formed thereon.

Both the reinforcement plate 3 and the coin container shield 4 has a key receiving hole 32 or 44 formed thereon for the insertion of the key.

A locking mechanism 2 is mounted on a support plate 5 which has a plurality of holes 51 fit over the threaded rods 12 of the outer casing 1 and thus sandwich the plate portion 40 of the coin container shield 4 and the reinforcement plate 3 between the support plate 5 and the front wall 10 of the outer casing member 1. Nuts 60 that engage the threaded rods 12 are used to secure the support plate 5, and thus the coin container shield 4 and the reinforcement plate 3, to the inner surface of the front wall 10 of the outer casing member 1.

Figure 3:
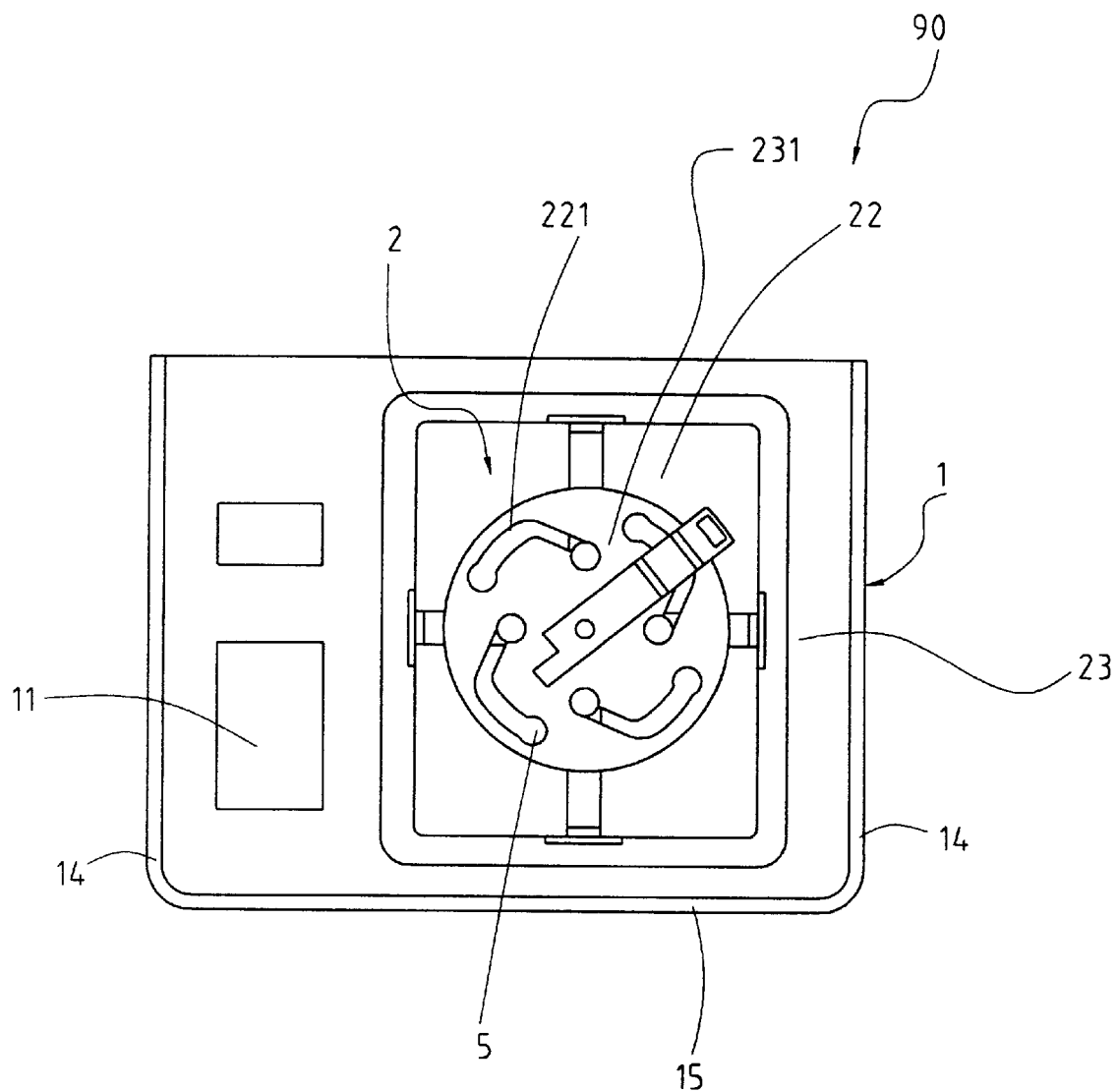
FIG. 3 is a rear side view showing the lower casing of the present invention in an unlocked (released) condition.
Figure 4:
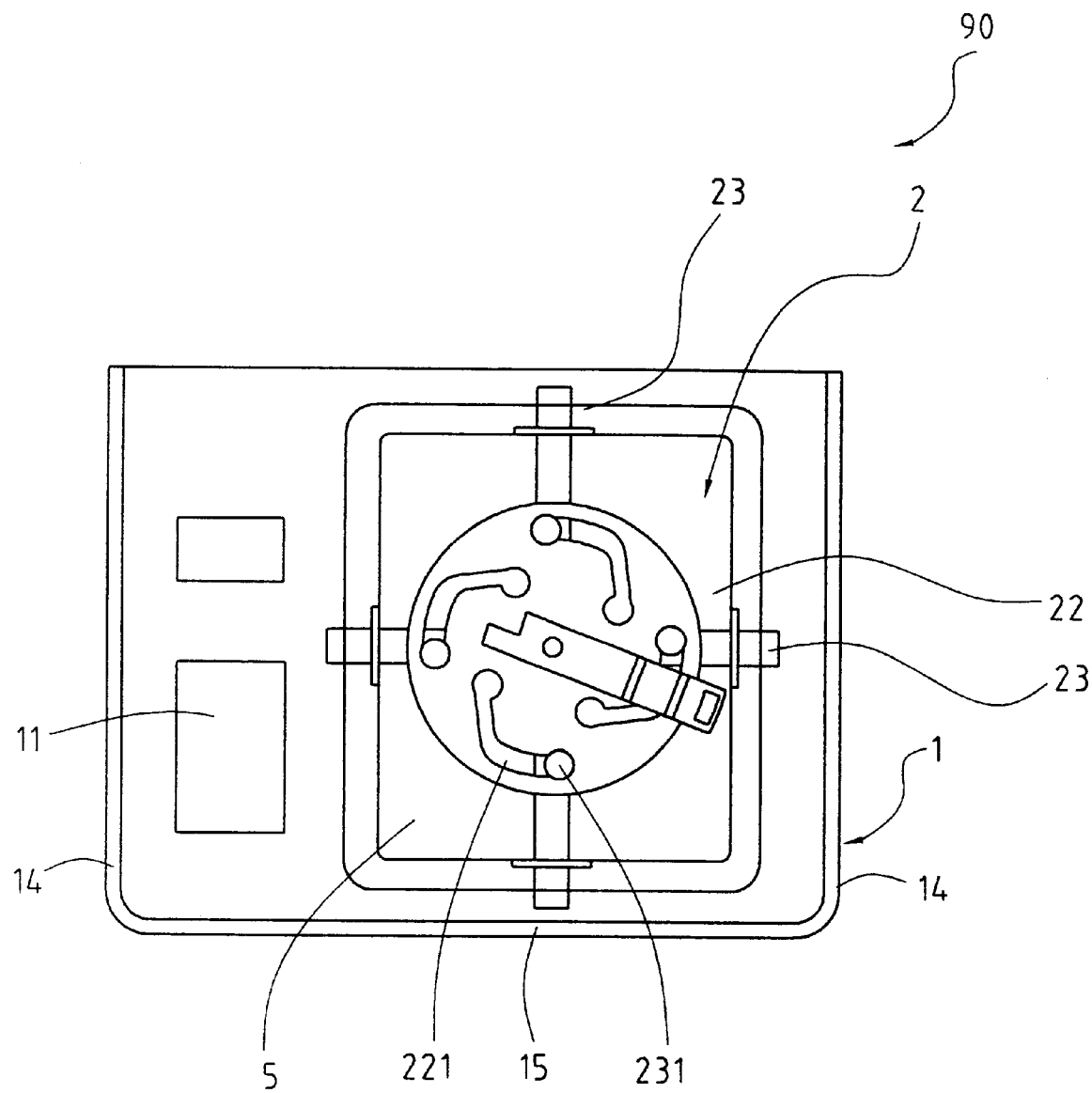
FIG. 4 is a rear side view, similar to FIG. 3, but showing the lower casing of the present invention in a locked (secured) condition.

The locking mechanism 2 comprises a rotatable disk 22 which is rotatably supported on the support plate 5. The rotatable disk 22 is operable by means of the key (not shown) inserted into the payphone 100 through the key hole 13 provided on the front wall 10 of the outer casing member 1 and the holes 32 and 44 on the reinforcement plate 3 and the coin container shield 4. The key that enters the key hole 13 of the outer casing member 1 and extends through the holes 32 and 44 of the reinforcement plate 3 and the coin container shield 4 engages a key way (not shown) provided on the locking mechanism 2 for rotating the rotatable disk 22 so that the rotatable disk 22 may be rotatable between a locked (secured) position (FIG. 4) and an unlocked (released) position (FIG. 3).

The locking mechanism 2 comprises a plurality of camming slots 221 within each of which a follower pin 231 is movably received. Each of the follower pins 231 has a latch 23 fixed thereto and extending in a radial direction with respect to the pivot 50 of the rotatable disk 22. The camming slots 221 are configured so that when the rotatable disk 22 is rotated between the locked and unlocked positions, the camming slots 221 drive the latches 23 to move radially in a direction toward/away from the pivot 50 by means of the camming engagement between he camming slots 221 and the follower pins 231.

The securing slots 42 of the coin container shield 4 are arranged to be corresponding to the latches 23 in both position and quantity so that when the latches 23 are moved radially from the unlocked position (FIG. 3) to the locked position (FIG. 4) by means of the rotation of the rotatable disk 22, the latches 23 extend through the securing slots 42. The payphone 100 is provided with locking slots or holes (not shown) inside the payphone casing and the locking holes inside the payphone are positioned corresponding to the securing slots 42 of the coin container shield 4 so that the latches 23 that extend through the securing slots 42 engage the locking holes inside the payphone and thus secure the lower casing 90 of the present invention to the payphone 100.

In accordance with the present invention, all the parts that constitute the lower casing 90 are separate from each other and secured to each other by releasable means so that the maintenance cost for any damaged parts is reduced, while the mechanical strength for protection the coin collection container (not shown) is enhanced for the reinforcement plate 3, the coin container shield 4 and the support plate 5 all provide protection to the coin collection container in case that the outer casing member 1 is maliciously damaged.

When the payphone 100 is forcibly struck, the striking force that acts upon the lower casing 90 is sequentially counter-acted by the outer casing member 1, the reinforcement plate 3, the coin container shield 4, the support plate 5 and the locking mechanism 2 so that in case that the outer side members (such as the outer casing member 1 and the reinforcement plate 3) are sufficient to resist the striking force, then the inner side members (such as the coin container shield 4, the support plate 5 and the locking mechanism 2) may maintain intact. Further, the damaged outer side members may then be removed by releasing the nuts 60 that secure the support plate 5, the coin container shield 4 and the reinforcement plate 3 to the outer casing member 1 and replaced by new ones. The cost of repairing would thus be cut down.

Although the preferred embodiment has been described to illustrate the present invention, it is apparent that changes and modifications in the specifically described embodiment can be carried out without departing from the scope of the present invention. Such modifications and changes should be considered within the scope of the present invention which is intended to be limited only by the appended claims.

What is claimed is:

1. A lower casing structure adapted to be releasably attached to a lower portion of a payphone to protect the lower portion of the payphone in which a coin collection container may be arranged, the lower casing structure comprising an outer casing member configured to fit over the lower portion of the payphone and having a plurality of threaded rods fixed thereon, a reinforcement plate having a plurality of holes corresponding to and fit over the threaded rods, a coin container shield having a plate portion on which a plurality of holes corresponding to and fit over the threaded rods and a flange on which securing slots are formed and a support plate having a plurality of holes corresponding to and fit over the threaded rods so as to sandwich the coin container shield and the reinforcement plate between the support plate and the outer casing member, nuts being provided to engage the threaded rods for securing the support plate to the outer casing member, a locking mechanism being provided on the support plate, comprising a rotatable member supported on the support plate and adapted to be manually rotated between a first position and a second position, the rotatable member comprising a plurality of camming slots formed thereon, each having a follower pin movably received therein to form a camming engagement therebetween, each of the follower pins having a latch fixed thereto to be corresponding to one of the securing slots of the coin container shield and moveable with the follower pin with respect to the coin container shield so that when the rotatable member is rotated between the first and second positions, the camming engagement between each of the camming slots and the respective follower pin drives the latch to extend through the securing holes for securing the lower casing structure to the lower portion of the payphone.

2. The lower casing structure as claimed in claim 1, wherein the outer casing member comprises a key receiving hole and wherein the locking mechanism is operable by means of a key received through the key receiving hole to be moved between the first and second positions.

\* \* \* \* \*